US012615146B2

(12) United States Patent
Gagliardoni

(10) Patent No.: US 12,615,146 B2
(45) Date of Patent: Apr. 28, 2026

(54) METHODS AND SYSTEMS FOR SYNCHRONIZING A DEVICE WITH A BLOCKCHAIN

(71) Applicant: NAGRAVISION SARL, Cheseaux-sur-Lausanne (CH)

(72) Inventor: Tommaso Gagliardoni, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 173 days.

(21) Appl. No.: 18/712,210

(22) PCT Filed: Nov. 23, 2022

(86) PCT No.: PCT/EP2022/082984
§ 371 (c)(1),
(2) Date: May 21, 2024

(87) PCT Pub. No.: WO2023/094451
PCT Pub. Date: Jun. 1, 2023

(65) Prior Publication Data
US 2024/0413990 A1     Dec. 12, 2024

(30) Foreign Application Priority Data
Nov. 23, 2021     (EP) .................................... 21250007

(51) Int. Cl.
*H04L 9/08*          (2006.01)
*H04L 9/00*          (2022.01)
(52) U.S. Cl.
CPC .......... *H04L 9/0891* (2013.01); *H04L 9/0825* (2013.01); *H04L 9/50* (2022.05); *H04L 2209/56* (2013.01)

(58) Field of Classification Search
CPC ....... H04L 9/0891; H04L 9/50; H04L 9/0825; H04L 2209/56
See application file for complete search history.

(56) References Cited

U.S. PATENT DOCUMENTS

| | | | | |
|---|---|---|---|---|
| 10,880,070 B1 * | 12/2020 | Delaney | .................. | G06F 21/64 |
| 2012/0089718 A1 * | 4/2012 | Berg | ......................... | G06F 8/61 |
| | | | | 709/223 |
| 2019/0280871 A1 * | 9/2019 | Subramanian | .......... | H04L 63/08 |
| 2021/0067328 A1 * | 3/2021 | Verheyen | ............ | H04L 63/0442 |
| 2025/0024393 A1 * | 1/2025 | Abreu | ................ | H04W 56/001 |

FOREIGN PATENT DOCUMENTS

CN          111756645 A     10/2020

OTHER PUBLICATIONS

European Search Report dated Apr. 26, 2022, for European Patent Application No. 21250007.9; 9 pages.
International Search Report and Written Opinion, PCT Application No. PCT/EP2022/082984 dated; 10 pages.

* cited by examiner

*Primary Examiner* — Lynn D Feild
*Assistant Examiner* — Vladimir I Gavrilenko
(74) *Attorney, Agent, or Firm* — POLSINELLI LLP

(57)          ABSTRACT

A method of synchronizing a device with a blockchain includes: receiving information about a first state of a blockchain; generating an RF broadcast signal encoding the information about the first state of the blockchain; and transmitting, at a first time, the first broadcast signal to the device. Similar methods for maintaining synchronization and for writing new data to a blockchain are also provided, as well as corresponding devices.

14 Claims, 10 Drawing Sheets

S30: Client device sends registration request.

S32: If request validated, client device transmits public key.

S34: Receive encrypted session key.

S36: Decrypt encrypted session key.

S40: Receive encrypted RF broadcast signal.

S41: Decrypt encrypted RF broadcast signal using decrypted session key.

S42: Store information about the current state of the blockchain.

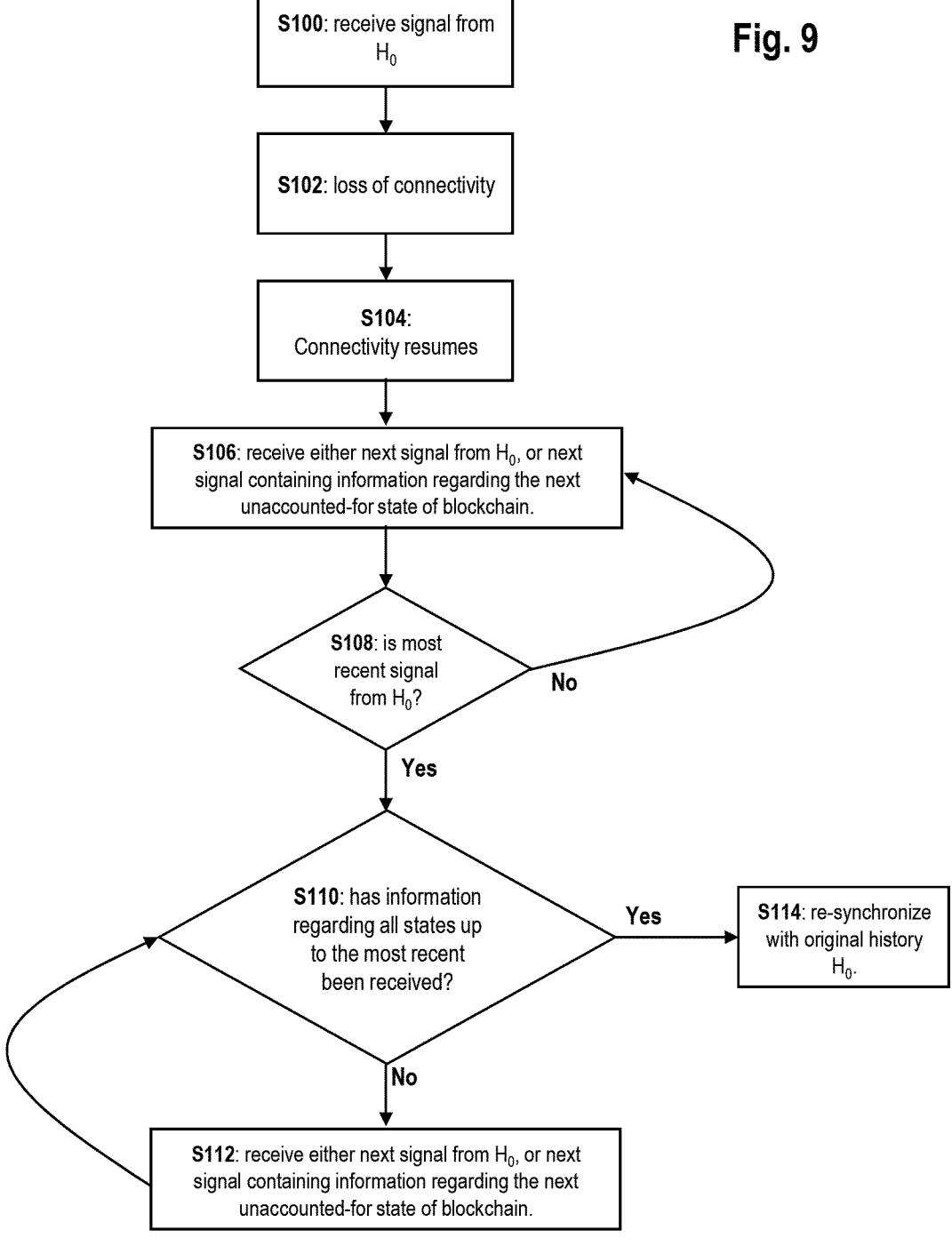

Fig. 9

S100: receive signal from $H_0$

S102: loss of connectivity

S104: Connectivity resumes

S106: receive either next signal from $H_0$, or next signal containing information regarding the next unaccounted-for state of blockchain.

S108: is most recent signal from $H_0$?

No

Yes

S110: has information regarding all states up to the most recent been received?

Yes

S114: re-synchronize with original history $H_0$.

No

S112: receive either next signal from $H_0$, or next signal containing information regarding the next unaccounted-for state of blockchain.

No internet connection

Internet connection

METHODS AND SYSTEMS FOR SYNCHRONIZING A DEVICE WITH A BLOCKCHAIN

CROSS-REFERENCES TO RELATED APPLICATIONS

This application is a U.S. National Stage of PCT Application No. PCT/EP2022/082984, filed Nov. 23, 2022, which claims the priority benefit of European Patent Application No. 21250007.8 filed on Nov. 23, 2021, both of which are incorporated herein by reference in their entirety for all purposes.

TECHNICAL FIELD OF THE INVENTION

The present invention relates to methods and systems for synchronizing devices with a blockchain, with particular applicability to synchronizing low-powered or remotely-located devices, or other devices which are unable to maintain an active internet connection for long periods of time.

BACKGROUND TO THE INVENTION

Blockchain is emerging as a useful tool for many applications, including internet-of-things (IoT) and embedded, low-powered devices such as RFIDs and tracking beacons. The nature of this technology requires devices to synchronize with the current state of the blockchain. The state of the blockchain generally changes continuously, sometimes every few seconds. In order to preserve the integrity of the blockchain, a device cannot perform useful operations with a blockchain unless it is synchronized with the current state of the blockchain. This synchronization operation typically requires a device to download a large amount of information from the internet, and then to maintain an internet connection in order to remain synchronized with the current state of the blockchain.

However, low-powered devices, or devices located in remote, rural areas often do not have the resources to keep this connection alive (the former because of energy and performance constraints, the latter because of high cost or lack of connectivity). Even if it is only necessary for a device to read from the blockchain (as opposed to writing new blocks to, or otherwise changing the status of the blockchain) without a way to synchronize with the blockchain in real time, it is only possible for the device to rely on possibly out-of-date information embedded into its internal memory before deployment. This severely limits the applicability of blockchain technology for this kind of device.

The present invention solves this problem by providing methods and systems for ensuring that devices such as low-powered devices and remotely-located devices are able to remain synchronized with a blockchain.

SUMMARY OF THE INVENTION

At a high level, the present invention solves the problems associated with the prior art by broadcasting updates to the blockchain using a radiofrequency (RF) signal, enabling devices to passively receive the information necessary to remain synchronized with a blockchain. For example, newly generated Bitcoin blocks may be broadcast in real time. The service can be delivered either via satellite broadcast or by traditional digital land radio on a dedicated channel. The device requires only an antenna to receive the broadcast signal, and therefore to remain in synchronization with the blockchain. This is possible on the kinds of low-powered device for which the invention of the present invention is particularly useful, because signal reception is considerably less expensive that signal transmission in terms of both power consumption and hardware complexity.

Specifically, in a first aspect, the present invention achieves this by providing a method of synchronizing a device with a blockchain, the method including: receiving information about a current state of a blockchain; generating an RF broadcast signal encoding the information about the current state of the blockchain; and transmitting the broadcast signal to the device.

In a second aspect, the present invention provides a broadcasting system for synchronizing a device with a blockchain, the broadcasting system including: an interface configured to receive information about a current state of a blockchain; an RF broadcast signal generator configured to generate an RF broadcast signal encoding the information about the current state of the blockchain; an RF transmitter configured to transmit the RF broadcast signal to the device.

It will be noted that, according to the present invention, it is not only a broadcasting system which operates in a new and technically advantageous way. The device, which may be a low-powered device or a device which only has intermittent internet connectivity, also performs new steps which enable it to overcome the difficulties with maintaining synchronization with a block chain, i.e. by receiving the broadcast signal, and storing the updated state of the blockchain in its internal memory. Accordingly, a third aspect of the present invention provides a method of maintaining synchronization with a blockchain, the method including the steps of: receiving a first RF broadcast signal encoding information about a first state of a blockchain; and storing the information about the first state of the blockchain in a memory.

A corresponding fourth aspect of the invention provides a device including: an RF antenna configured to receive a first RF broadcast signal from a broadcasting system, the first RF broadcast signal encoding information about a first state of a blockchain; and a memory, wherein the device is configured to store the information about the first state of the blockchain in the memory.

The present invention is related to the synchronization of low-powered devices, or devices with intermittent internet connectivity, with a blockchain. The previous aspects of the invention described above are focused on a process by which information about the state of the blockchain is passively received and stored by the device, based on an RF broadcast signal. However, it is equally useful for such devices to be able to write their own information to the blockchain. In order to preserve the integrity of the data on a blockchain, it is not possible simply to add a block to the blockchain as soon as internet connectivity is restored, since blocks may have been added to the chain since then. It is not possible simply to slot a block into an earlier position on the chain, since the contents of each block depend, in part, on the state of the blockchain at the time that the block is generated and added to the chain.

In order to address this issue, when the device has no internet connectivity (though is, of course, still receiving updates from the blockchain via an RF broadcast signal), and has generated some form of data which needs to be written to the blockchain, it authenticates the data using the information about the current state of the blockchain, and for example, a time stamp. Then, when internet connectivity is restored, e.g. when it enters the range of a Wi-Fi network, the data can be uploaded to the blockchain, whereupon it may be authenticated by verifying that the authentication data corresponds to the state of the blockchain at the time the data was generated. Accordingly, a fifth aspect of the invention provides a method of uploading data to a blockchain by a device having intermittent internet connectivity, the method including the steps of: receiving a first RF broadcast signal encoding information about a first state of a blockchain; storing the information about the first state of the blockchain in a memory; when there is no internet connectivity: generating data to be written to the blockchain, the data including a timestamp indicating the time at which the data was generated; generating authentication data based on the information about the first state of the blockchain; and storing the data and the authentication data in a temporary memory of the device; and when there is internet connectivity: transmitting the data and the authentication data to the blockchain via the internet.

A corresponding sixth aspect of the invention provides a device including: an RF antenna configured to receive a first RF broadcast signal from a broadcasting system, the first RF broadcast signal encoding information about a first state of a blockchain; a processor; a memory including at least a temporary memory; and a transmitter, wherein: the device is configured to store the information about the first state of the blockchain in the memory; when there is no internet connectivity, the processor is configured to: generate data to be written to the blockchain, the data including a timestamp indicating the time at which the data was generated; and generate authentication data based on the information about the first state of the blockchain; and the device is configured to store the data and the authentication data in the temporary memory; and when there is internet connectivity, the transmitter is configured to transmit the data and the authentication data to the blockchain via the internet.

It will be appreciated that, where compatible, the different aspects of the invention may be combined together. For example, a seventh aspect of the invention may provide a method including all of the steps of the first aspect and the third aspect, or alternatively, all of the steps of the first aspect and the fifth aspect. Similarly, an eighth aspect of the invention may provide a system including the broadcasting system of the second aspect, and a device of either the fourth or sixth aspects of the invention.

Further optional features of the invention are set out in detail below, with reference to the drawings. It should be noted that the optional features may be applied to any or all of the aspects set out about, where compatible.

The invention includes the combination of the aspects and preferred features described except where such a combination is clearly impermissible or expressly avoided.

BRIEF DESCRIPTION OF THE DRAWINGS

Embodiments of the invention will now be description with reference to the drawings, in which:

FIG. 9 is a flowchart illustrating a process which takes place after a loss of connectivity in order to retain synchronization with the blockchain, and to hop back onto the original history $H_0$.

DETAILED DESCRIPTION OF THE DRAWINGS

Aspects and embodiments of the present invention will now be discussed with reference to the accompanying figures. Further aspects and embodiments will be apparent to those skilled in the art. All documents mentioned in this text are incorporated herein by reference.

Figure 1:
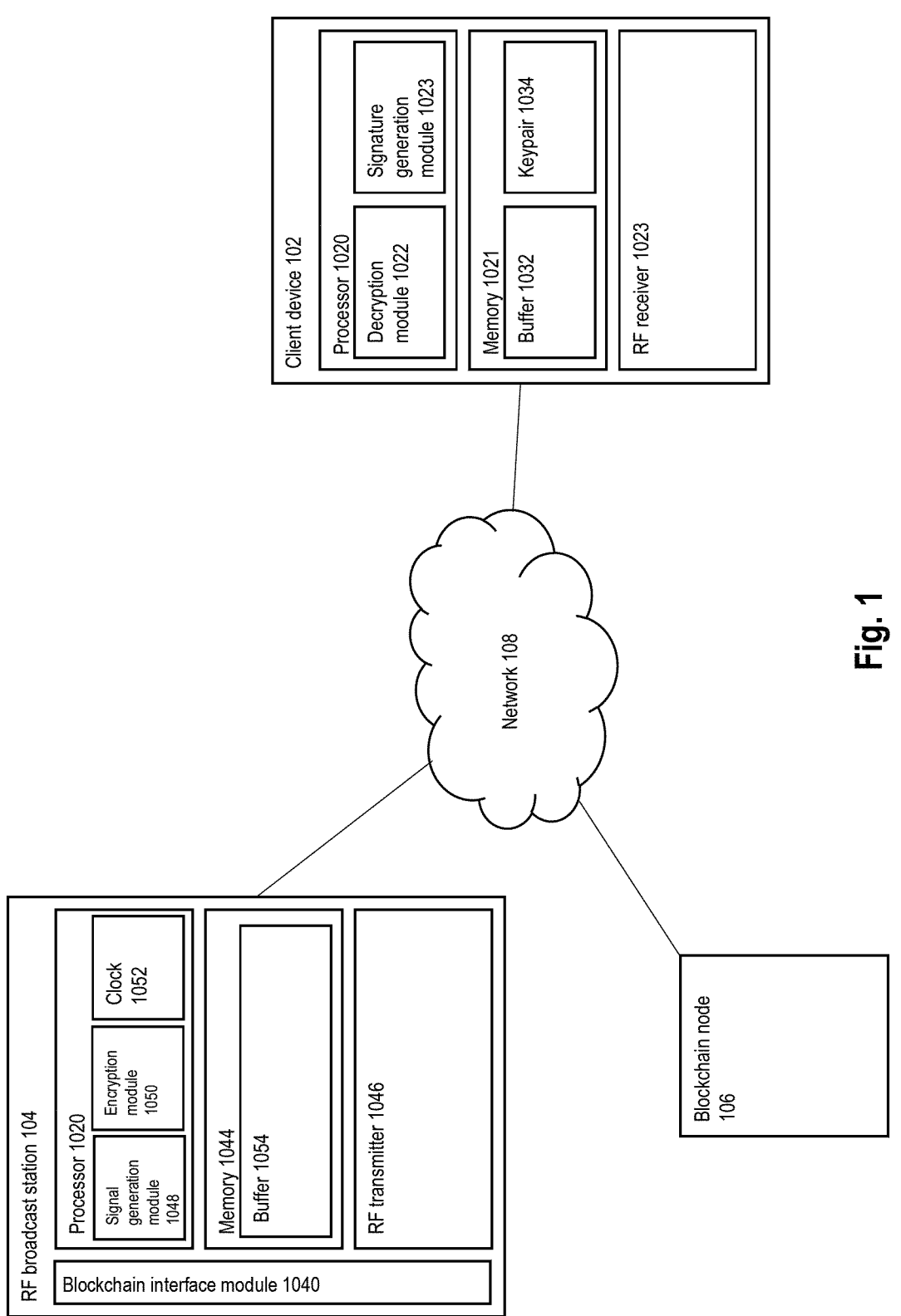
FIG. 1 shows a system in which a client device with intermittent internet connectivity, or a low-powered client device may be synchronized with a blockchain using an RF broadcast station.

FIG. 1 shows a system 100 which may be used to execute methods according to the present invention. System 100 includes a client device 102, which may be any device, such as a computer, a tablet, a smartphone, an edge computing device, or the like. The client device 102 may be a low-powered device, which may have intermittent internet connectivity, but which may still wish to upload data to the blockchain. The present invention provides ways for such a device to maintain synchronization with a blockchain. The system 100 further includes an RF broadcast station 104, which may be any entity which is able to generate and broadcast RF signals. The present application focuses on RF signals, but it should be noted that other frequency signals may be used, if it is more appropriate. In the context of the present invention, the term RF (i.e. radiofrequency) should be understood to cover frequencies from 30 Hz to 300 GHz. System 100 further includes a blockchain (BC) node 106. It will be understood that by its very nature, a blockchain is not stored in one place: it is a distributed ledger to which blocks are added at various intervals. In FIG. 1, which is a schematic representation, blockchain node 106 is a node on the blockchain, or an entry point to the blockchain, which is connected to the RF broadcast station 104 via network 108. The network may be a wired network, or a wireless network, such as a cellular network, or a Wi-Fi network. The crucial point to note is that the RF broadcast station 104 is able to retrieve information about the current state of the blockchain via the blockchain node 106. The means by which the RF broadcast station 104 is able to retrieve the information about the current state of the blockchain via the blockchain node 106 is not important for the present invention.

We now briefly discuss the various modules which are shown in each of the components of system 100 in FIG. 1. The functions of these components will be explained in more detail later in the application. The client device may include a processor 1020, a memory 1021, an RF receiver 1023, e.g. in the form of an RF antenna. The processor may include a decryption module 1022 and a signature generation module 1024. The memory may include a buffer 1032, and stores at least a public key and private key (key pair 1034). The RF broadcast station 104 may include a blockchain interface module 1040, a processor 1042, a memory

1044, an RF transmitter 1046 e.g. in the form of an RF antenna. The processor 1042 may include a signal generation module 1048, an encryption module 1050, and a clock 1052. The memory may include a buffer 1054.

Figure 2:
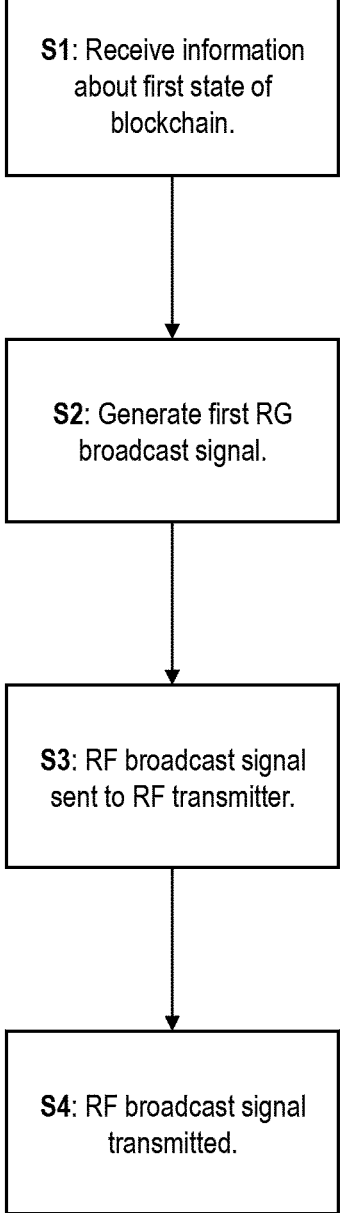
FIG. 2 is a flowchart illustrating a method according to a first aspect of the invention.

FIG. 2 is a flowchart showing a method according to the first aspect of the invention, which provides a method of synchronizing a device with a blockchain. The method is preferably performed at or by the RF broadcast station 104. In step S1, information about a first state of the blockchain is received. Preferably, the information is received at the RF broadcast station 104 from the blockchain node 106, via the blockchain interface module 1040. The information about the first state of the blockchain may include a first block, the first block comprising: a first payload, and first authentication data. Herein, "payload" is used to refer to meaningful data, i.e. the data which a given user or users wish to store, securely, on the blockchain. Authentication data is data which is used to preserve the integrity of the blockchain. In preferred cases, the authentication data comprises a deterministic transformation of the contents of the previous block in the block chain, or a portion thereof. Preferably, the deterministic transformation is in the form of a hash.

Then, in step S2, a first RF broadcast signal which encodes the information about the first state of the blockchain is generated. Preferably, the signal generation module 1048 of the processor 1042 of the RF broadcast station 104 generates the RF broadcast signal. In some cases, the information about the first state of the blockchain may be stored in the buffer 1054, which is accessible by the signal generation module 1048 to generate the RF broadcast signal.

Finally in step S3 at a first time, the generated RF broadcast signal is sent to RF transmitter 1046, which may be in the form of an RF antenna; at that point the RF broadcast signal encoding the information about the first state of the blockchain is transmitted by the RF transmitter 1046 in step S4. Once this process is complete, i.e. steps S1 to S3 have been executed by the system 100, the process may repeat itself. Specifically, the method of the first aspect of the invention may then further comprise a step of receiving information about a second state of the blockchain, again preferably at the RF broadcast station 104 from the blockchain node 106, via the blockchain interface module 1040. As with the first, the information about the second state of the blockchain may include a second block, which may comprise a second payload and second authentication data. The second authentication data preferably again comprises a deterministic transformation of the contents of the first block in the blockchain, or a portion thereof. Once more, the deterministic transformation is preferably a hash. Next, the method may further comprise generating a second RF broadcast signal encoding the information about the second state of the blockchain. Specifically, the signal generation module 1048 of the processor 1042 of the RF broadcast station 104 generates the second RF broadcast signal. Again, the information about the second state of the blockchain may be stored in the buffer 1054, which is accessible by the signal generation module 1048 to generate the RF broadcast signal. Finally, the method may further comprise: transmitting the second RF broadcast signal at a second time, the second time and the first being separated by a first interval. This process may be repeated for each new block that is added to the blockchain, to ensure that the client device 102 is kept updated at all times, and has all of the information required to validly write new information to the blockchain at any given time.

In generic terms, the method may comprise: receiving information about an $i^{th}$ state of a blockchain; generating an $i^{th}$ RF broadcast signal encoding the information about the $i^{th}$ state of the blockchain; and at a time $t_i$, transmitting the $i^{th}$ broadcast signal to the device. Here, i may take values from 1 (i.e. the first broadcast) to N (i.e. the final broadcast). N may be arbitrarily high for a constant broadcast.

In some cases, the devices (e.g. client device 102) which are to receive the RF broadcast signals, which may be low-powered and have only intermittent internet connectivity, may be unable to receive the broadcast signal at a particular time, e.g. because they are passing through an area which is unreachable by the RF broadcast signal, or due a technical error. Some implementations of methods/systems of the present invention aim to address this problem by transmitting the information several times in succession so that the client device 102 is able to receive a set of transmissions at a later time.

Specifically, the method may further comprise re-transmitting the first RF broadcast signal at a third time, the third time being separated from the first time by a second interval. In this way, if, for whatever reason, the client device 102 is unable to receive the first transmission of the first RF broadcast signal, it may be able to receive the first re-transmission of that signal. According to methods/systems according to the present invention, every RF broadcast signal may be re-transmitted at least once, the first re-transmission taking place after the second interval. Specifically, the method may further comprise re-transmitting the second RF broadcast signal at a fourth time, the fourth time and the second time being separated by the second interval.

Of course, it is possible that the client device 102 may also miss the first re-transmission of the first RF broadcast signal, in which case the first RF broadcast signal may be re-transmitted a second time. This re-transmission may also be missed, and so on. In order to avoid this, the first RF broadcast signal may be re-transmitted a plurality of times after its initial broadcast. Specifically, the method may include: transmitting the first RF broadcast signal at a time $t_{1,0}$, and re-transmitting the first RF broadcast signal a plurality N times, where the $j^{th}$ re-transmission takes place at $t_{1,j}$. Each re-transmission is separated from the previous transmission (or re-transmission) by a time:

$$\Delta t_{1,j} = (t_{1,j} - t_{1,j-1})$$

Here, the "1" in the subscript indicates that we are referring to the first RF broadcast signal. In preferred cases, the intervals $\Delta t_{1,j}$ between each successive pair of re-transmissions increases as the value of j increases. Simply put, there is longer between each pair of re-transmissions. In a particularly preferred case, as the value of j increases, the intervals $\Delta t_{1,j}$ increase exponentially.

Combining the features outlined above, it will be appreciated that each RF broadcast signal which is generated may be re-transmitted j times. The time at which the $i^{th}$ broadcast signal is re-transmitted for the $j^{th}$ time may be parameterized as $t_{ij}$. A "history" $H_j$ may be defined as the set of RF broadcast signals having the same value of j. So, the zeroth history would represent the most recent, i.e. real-time status update, whereas the other streams $H_1$ are snapshots of the main history $H_0$ which are taken at different time points in the past. There may be N separate histories. In some cases, each history may be broadcast on its own respective channel, such as a frequency channel.

The maximum number N of possible concurrent streams depends on the capacity of the RF broadcast channel and the bandwidth required by the blockchain on a conservative basis. For example, if the blockchain requires a bandwidth of 400 kb/s in periods of high traffic, and the radio channel broadcasts at 2 Mb/s, then there can be a maximum of N=5 parallel streams (i.e. one "original" history, and 4 retransmissions of that history). Typically, $H_1$ will only be delayed a few seconds behind the main history stream, so that short connectivity losses can be recovered. $H_2$ may be delayed slightly longer, e.g. around 30 seconds. $H_3$ may be delayed a few minutes, $H_4$ may be delayed for an hour, and so on. As discussed, the distribution of delays preferably follows an exponential curve, as this allows devices eventually to re-join the main history $H_0$ after a period of loss of connectivity. Preferably, the maximum delay $\Delta t_{max} = t_{i,N} - t_{i,0}$ is equal to the maximum tolerable offline period for a client device 102, which may be referred to herein as the "apnoea time". If a device loses connectivity for a period of time longer than the apnoea time, then synchronization with the blockchain is unrecoverable, and the device should be reinitialized.

Figure 3:
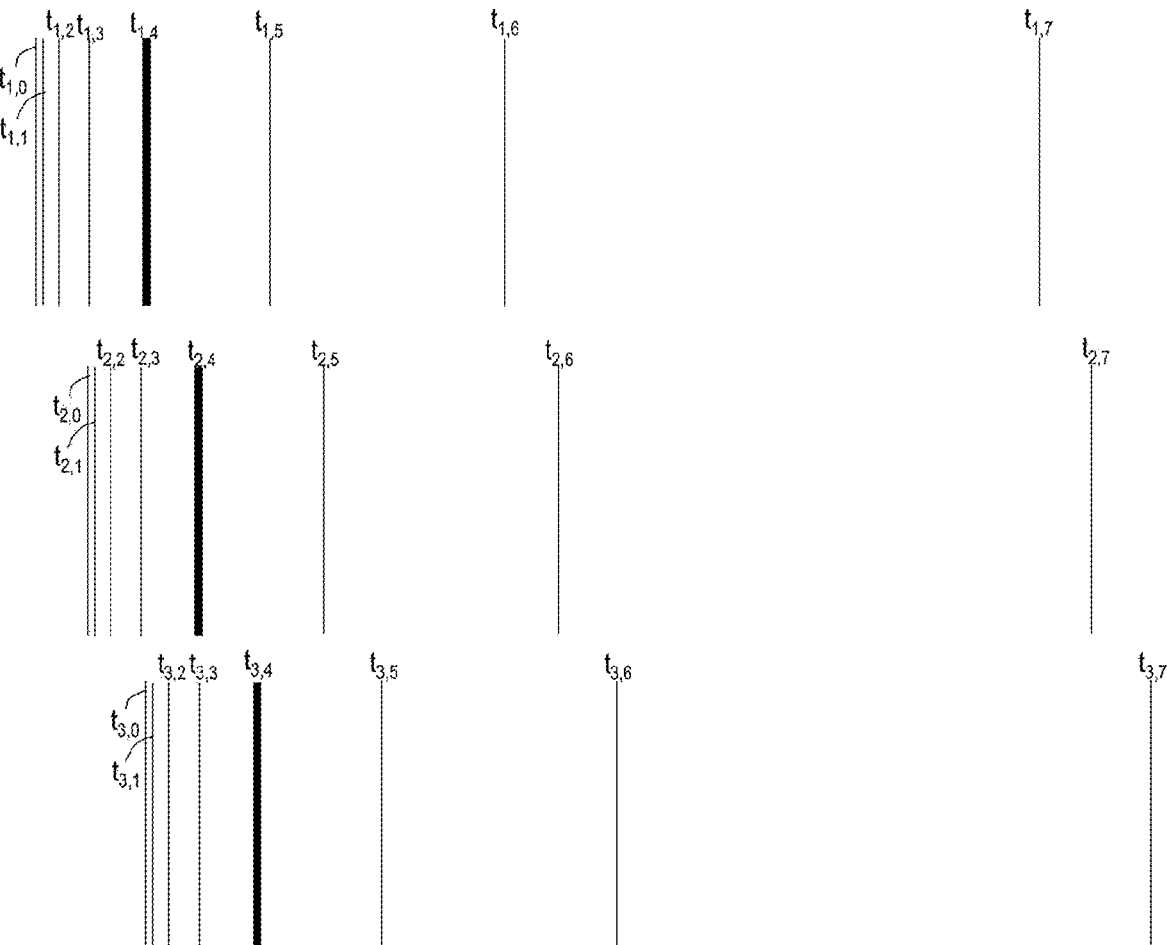
FIG. 3 is a timing diagram illustrating the transmission and retransmission of a plurality of RF broadcast signals.

FIG. 3 shows a timing diagram including a plurality of times $t_{ij}$, illustrating the above. In FIG. 3, each vertical line represents a time at which an RF broadcast signal is sent. The top row represents signals corresponding to the first state of the blockchain (i.e. i=1), the second row represents signals corresponding to the second state of the blockchain (i.e. i=2), and the bottom row represents signals corresponding to the third state of the blockchain (i.e. i=3). There are a plurality of signals within each row; these represent the subsequent histories, i.e. the retransmissions of each original RF broadcast signal. Across the three signals, those signals which are transmitted at times with the same j value are signals in the same history.

It may be desirable only to allow authorized devices to access the blockchain updates which are provided by the series of RF broadcast signals. In order to enable this, the information stored in each of the RF broadcast signals may be encrypted using some kind of session key. Accordingly, generating the first RF broadcast signal may comprise encrypting the information about the first state of the blockchain with a session key, for example using encryption module 1048 of the processor 1042 of the RF broadcast station 104, to generate an encrypted RF broadcast signal. This step may take place as a sub-step of step S2 in FIG. 2, for example.

Figure 4:
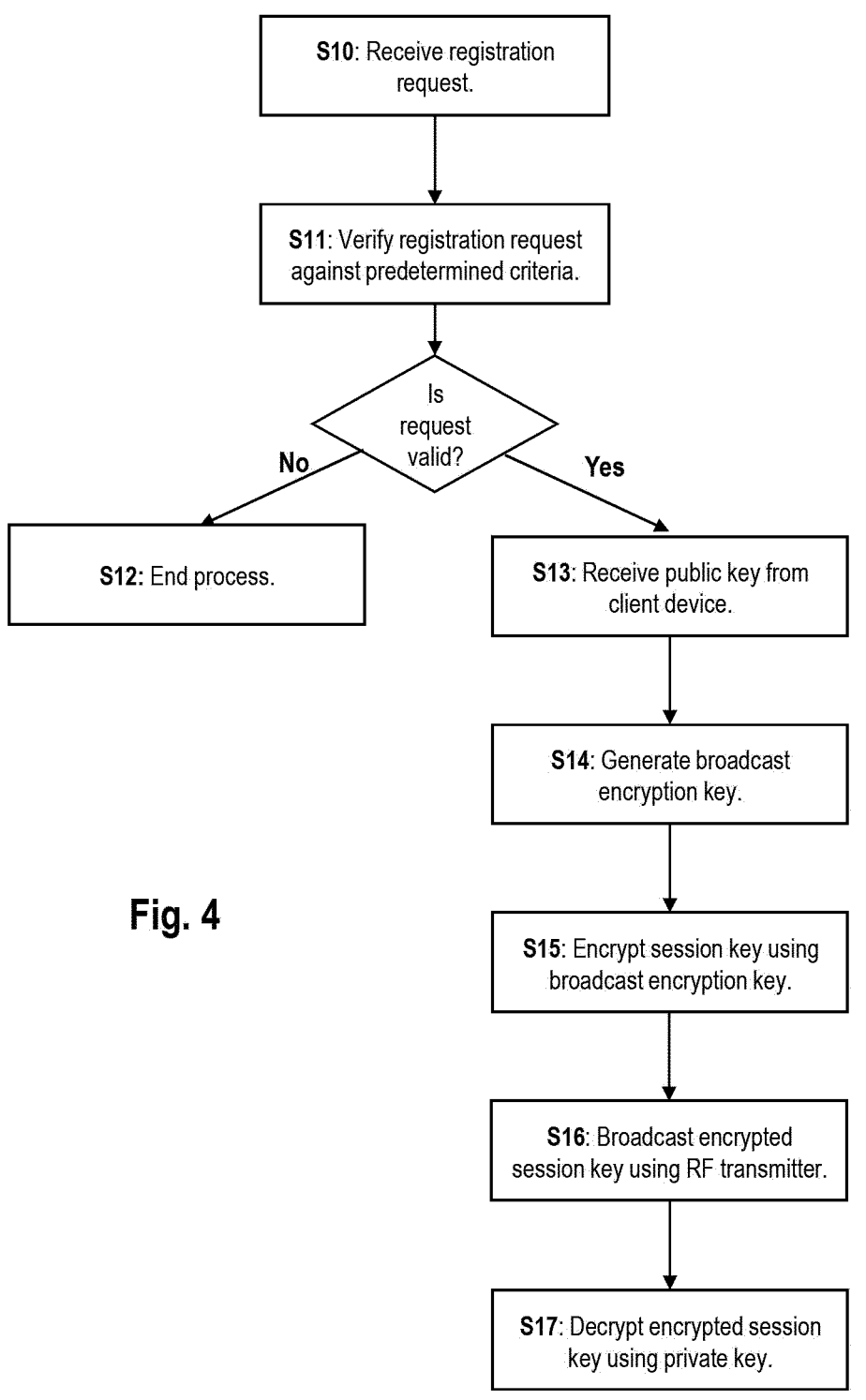
FIG. 4 is a flowchart illustrating a registration process, and a process by which a session key may be encrypted and distributed to a user or users.

In order to ensure that the client device is able to decrypt the encrypted RF broadcast signals, the method may further comprise: receiving a public key from the device; generating a broadcast encryption key based on at least the public key; encrypting the session key using the broadcast encryption key; and transmitting the encrypted session key to the device, the encrypted session key being decryptable using a private key on the device. This process is illustrated in more detail FIG. 4, which shows an example process for a registration process which enables the client device 102 to be able to decrypt the encrypted RF broadcast signal. In a first step S10, the RF broadcast station 104, may receive a registration request from the client device 102. Specifically, a registration module 1053 of the processor 1042 may receive the registration request. In some cases, where, for example, access to the blockchain status updates is a paid-for service, the registration request may include a monetary transaction—but this is not central to the invention. In a second step S11, the request verification module 1055 of the registration module of the processor 1042 may verify the received request against some predetermined criteria which is outside the scope of this application. In the case where the request verification module 1055 determines that the registration request is not valid, no further steps are taken, and the registration process comes to a halt, see step S12 of FIG. 4. However, in the case that the request verification module 1055 determines that the registration request is valid, the method proceeds to step S13, in which (for example in response to a request from the registration module 1053), a public key is received from the client device 102. This is preferably a public key which is associated with the client device 102 and the client device 102 alone, for security reasons. In step S14, the broadcast encryption key generation module 1056 generates a broadcast encryption key based on the received public key. The skilled person understands that a broadcast encryption key is one which, when generated based on a given public key, is decryptable using the corresponding private key. In most implementations of the invention, the registration module 1053 will receive a plurality of valid registration requests, and accordingly will receive a plurality of public keys corresponding to the plurality of users who made the valid enquiries. In those cases, the broadcast encryption key generation module 1056 is preferably configured to generate the broadcast encryption key based on the plurality of public keys, such that data encrypted using the broadcast encryption key can be decrypted by any of the private keys corresponding to the public keys based on which the broadcast encryption key was generated. Broadcast encryption schemes which may be used to generate broadcast encryption keys in this way are known to the skilled person[1] [2]. A preferred broadcast encryption scheme is the AACS broadcast encryption scheme[3], which is able to efficiently achieve the above functionality even for billions of devices which are completely offline and impossible or difficult to update.

[1]http://cryptowiki.net/index,php?title=Broadcast_encryption

[2]http://www.wisdom.weizmann.ac.il/~naor/PAPERS/broad abs.html

[3]https://en.wikipedia.org/wiki/Advanced_Access_Content_System

After the broadcast encryption key has been generated, in step S15 a session key is encrypted using the encryption module 1050 of the processor 1042, to generate an encrypted session key. Then, in step S16, the encrypted session key is broadcast using e.g. the RF transmitter 146 to at least the client device 102. Then, in step S17, the decryption module of the processor 1020 of the client device may use its private key to decrypt the encrypted session key thereby retrieving the session key which can then be used to decrypt the received encrypted RF broadcast signals.

It may be useful for the RF broadcast station 104 (i.e. the provider of the blockchain updates) to periodically update which client devices 102 are permitted to access the RF broadcast signal updates. This is useful in scenarios where, for example, the updates to the blockchain are a paid subscription service, and the provider wishes to add new users and remove others. In order to control this, in preferred implementations of the present invention, a rotating session key may be used. Specifically, after a predetermined time interval, the method may further comprise generating a new broadcast encryption key by the broadcast encryption key generation module 1056. The new broadcast encryption key is preferably generated on at least the received public key, and preferably on the received plurality of public keys for whom the registration requests are still valid. In other words, the public keys of new users may be added to the plurality of public keys, and the public keys for those users whose subscriptions have expired, or who have failed to pay will be removed. The method may also comprise generating a new session key; encrypting the new session key with the new broadcast encryption key (e.g. by the encryption module 1050); and transmitting (e.g. using the RF transmitter 1046)

the new encrypted session key. After the generation of the new session key, all generated RF broadcast signals are preferably encrypted using the new session key.

This process may be repeated at regular predetermined intervals, to ensure that users who are no longer permitted to access the updates to the blockchain cannot use the old session key. The period of time for which each session key is used may be referred to as an "era". All RF broadcast signals generated within a given era are then encrypted using the session key associated with that era. Using a broadcast encryption scheme such as AACS enables the broadcast authority, i.e. the provider of the blockchain updates to add or revoke client devices 102 dynamically at the beginning of any era.

Figure 5:
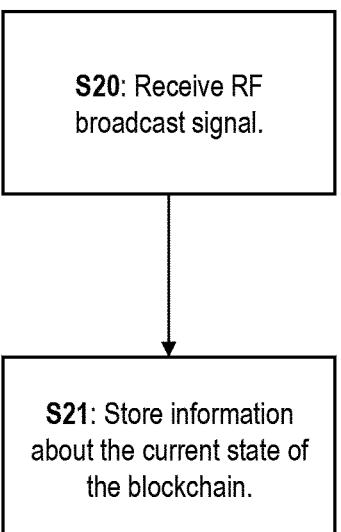
FIG. 5 is a simple flowchart illustrating a process by which information about a state of the blockchain is updated based on a received signal.
Figure 6:
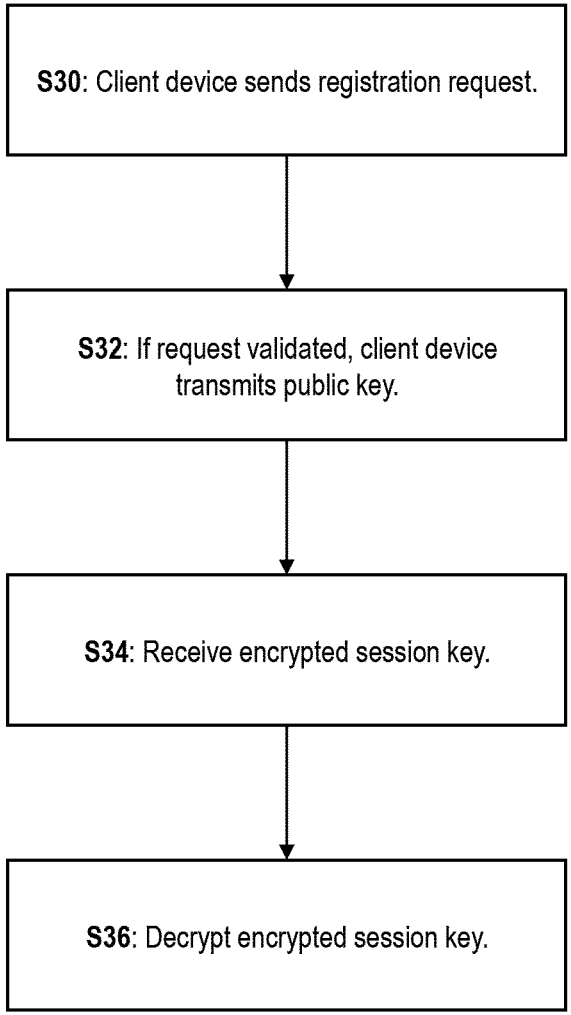
FIG. 6 is a flowchart illustrating the steps leading up to the decryption of a session key which may be used to decrypt information encoded in an RF broadcast signal.
Figure 7:
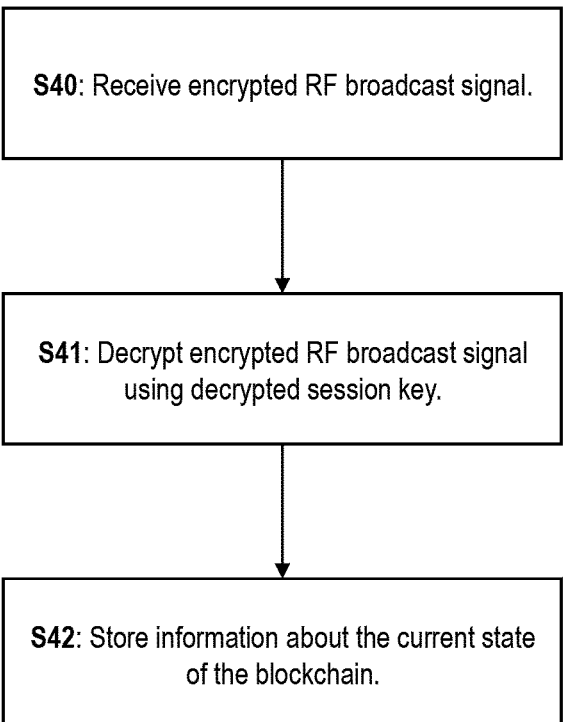
FIG. 7 is a flowchart illustrating a process by which a session key may be used to decrypt information encoded in an RF broadcast signal.

The above description focuses on the actions of the RF broadcast station 104 in generating, encryption, and transmitting the signals which are required to ensure that the client device 102 remains synchronized with the blockchain, of which blockchain node 106 is a node. We now consider the steps which are performed by the device 102 itself in order to remain synchronized. Here, by "remain synchronized", we mean that the client device 102 has available to it, e.g. on buffer 1032 the information about the current (or most recent) state of the blockchain 106, which enables it, where necessary, to write new information to it, via the blockchain node 106. It must be stressed that, for security purposes relating to the generally immutability of blocks in a blockchain, in order to remain synchronized with the blockchain, the client device 102 must possess information about the current state and all previous states. It is insufficient only to possess information about the most recent state. FIG. 5 shows a simple case in which the client device 102 does not lose any connectivity, and therefore is able simply to receive all of the RF broadcast signals the first-time round. In step S20, the RF receiver 1023 of the client device 102 receives an RF broadcast signal from the RF broadcast station 104. As discussed, the RF broadcast signal encodes information about the current state of the blockchain 106. Then, in step S21, the client device 102 stores the information about the current state of the blockchain in its memory 1021, for example in the buffer 1032. FIGS. 6 and 7 show examples of the processes by which the client device 102 obtains (FIG. 6) and then uses (FIG. 7) the session key as described earlier from the point of view of the RF broadcast station 104. In step S30, the client device 102 send a registration request, which is then verified by a component on the RF broadcast station 104. Then in step S32, in the event that the request is validated, the client device 102 transmits its public key (stored as part of keypair 1034 on memory 1021) to the RF broadcast station 104. In step S34, the client device 102 then receives an encrypted session key (encrypted using the broadcast encryption key as explained above), and in step S36 the decryption module 1022 of the processor 1020 of the client device decrypts the encrypted session key using the private key (stored as part of keypair 1034) to obtain the session key. FIG. 7 is a modified version of FIG. 5. In step S40, the RF receiver 1023 of the client device 102 receives an encrypted RF broadcast signal from the RF broadcast station 104. As discussed, the encrypted RF broadcast signal encodes encrypted information about the current state of the blockchain 106. Then, in step S41, the decryption module 1022 uses the now-decrypted session key to decrypt the encrypted RF broadcast signal, to obtain the information about the current state of the blockchain 106. Finally, in step S42, the client device 102 stores the information about the current state of the blockchain in its memory 1021, for example in the buffer 1032. It will be appreciated that the session key may change regularly, (i.e. every era), in which case the client device 102 may periodically receive a new encrypted session key, which is then used to decrypt all encrypted RF broadcast signals for the era while that session key is valid.

We now consider the case where the client device 102 misses a transmitted RF broadcast signal. In this case, assuming that the duration of time for which the client device 102 was unable to receive an RF broadcast signal is less than the apnoea time as previously defined, synchronization may be maintained by receiving a signal from a different history. Specifically, after missing a transmission of the first RF broadcast signal, the method may further comprise: receiving a retransmitted version of the first RF broadcast signal from a subsequent history, the retransmitted version of the first RF broadcast signal encoding the information about the first state of the blockchain; and storing the information about the first state of the blockchain in the memory of the device. Clearly, this can be extended to other missed broadcasts. More generally, after missing a transmission of the $i^{th}$ RF broadcast signal at a time $t_{i,0}$, the method may further comprise receiving a retransmitted version of the RF broadcast signal from a subsequent history $H_m$ at a time $t_{i,m}$ where m>0, the retransmitted version of the RF broadcast signal encoding information about the $i^{th}$ state of the blockchain; and storing the information about the $i^{th}$ state of the blockchain in the memory of the device. In some cases, the history from which the subsequent transmission is the immediately next history. Or, if the period of loss of connectivity is long, the history to which the client device 102 "re-synchronizes" may be the first history which is broadcasting the next signal which was not received by the client device 102.

Of course, this may be further generalized to cases where the device misses a transmission of an RF broadcast signal in a history other than the initial history $H_0$. In such cases, the client device 102 may "hop" from the history which it is on, to a subsequent history. It should be stressed that the client device 102 may not necessarily hop to the immediately subsequent history (i.e. from $H_j$ to $H_{j+1}$); if several broadcasts are missed, then the client device 102 simply stores the information from the first RF broadcast signal that it receives corresponding to the next block in the chain. In other words, after the device 102 misses one or more transmissions of an $i^{th}$ RF broadcast signal in a history $H_j$ at a time or series of times $t_{i,j}$, the method further comprises receiving a retransmitted version of the RF broadcast signal from a subsequent history $H_k$ at a time $t_{i,k}$ where k>j, the retransmitted version of the RF broadcast signal encoding information about the $i^{th}$ state of the blockchain; and storing the information about the $i^{th}$ state of the blockchain in the memory of the device. It should be stressed that the time $t_{i,k}$ is later than the time at which the device regains connectivity.

As discussed previously, each history may be transmitted on a different channel, such as a frequency channel. So, in order to switch to a different history, the device 102 may be configured to tune to a different frequency.

To remain synchronized with the blockchain, it is necessary for the client device 102 to receive all of the status updates. If reception is lost for an amount of time longer than the apnoea time, then it is not possible simply to resynchronize just by storing the information from the next RF broadcast signal which is received. Synchronization can only be maintained if the next RF broadcast signal which is received corresponds to a version of the RF broadcast signal which immediately follows the most recent RF broadcast signal for which information has been stored in the memory 1021 of the device 102.

When the client device 102 has hopped to a subsequent history, there are at least two options for next steps, on the assumption that the client device 102 will not further lose reception or connectivity. In a first case, the client device 102 may continue to receive the RF broadcast signals in the same history. This is the preferable option for performance-constrained device with a limited service lifetime, but such that they can afford to keep a slightly out-of-date blockchain synchronization status. Specifically, in these cases, after the device 102 has stored the information about the $i^{th}$ state of the blockchain based on a signal from a subsequent history $H_k$ at a time $t_{i,k}$, the method may further comprise receiving information about the $(i+1)^{th}$ state from the same history $H_k$ at a time $t_{i+1,k}$. More generally, in such cases, the method may further comprise receiving information about the $i^{th}$ state from the history $H_k$ at times $t_{i,k}$, where k>j, j representing the initial history.

In the second case, which is preferred in circumstances other than the above, after having stored the information from an RF broadcast signal in a subsequent history, the client device continues to store information from RF broadcast signals in the original history until enough time passes that the missing information caused by the loss of connectivity has been collected in the buffer 1032 of the memory 1021 of the client device 102. At that point, the client device 102 will recombine the information in order to synchronize back with the blockchain 106, and then continue to use the original history for synchronization. Until that point, the device will be synchronized with a past snapshot of the blockchain as from the history which it was using to maintain synchronization. In other words, after the device 102 has stored information about the $i^{th}$ state of the blockchain based on an RF broadcast signal from a subsequent history $H_k$ at a time $t_{i,k}$, the method may further comprise both:

at times $t_{i,m}$ receiving information about later states of the blockchain from an earlier history $H_m$ where m<k and storing the information to the buffer 1032 of the memory 1021; and receiving information about at least the $(i+1)^{th}$ state of the blockchain from the subsequent history $H_k$ at times $t_{n,k}$ where n={i+1, i+2 . . . } and storing the information to the buffer 1032 of the memory 1021; and when all of the information resulting from the missed transmissions has been obtained from the history $H_k$, combining the information received from the histories $H_k$ and $H_m$, thereby restoring synchronization, and continuing to obtain information from the RF broadcast signals in the history $H_m$.

Preferably, the history $H_m$ is the original history $H_0$. In this way, once synchronization has been restored, the client device 102 is once again receiving information from the original history. This is advantageous since it means that if there is a further loss of connectivity, there are more subsequent histories onto which the client device 102 may "hop" in order to receive updates.

Figure 8:
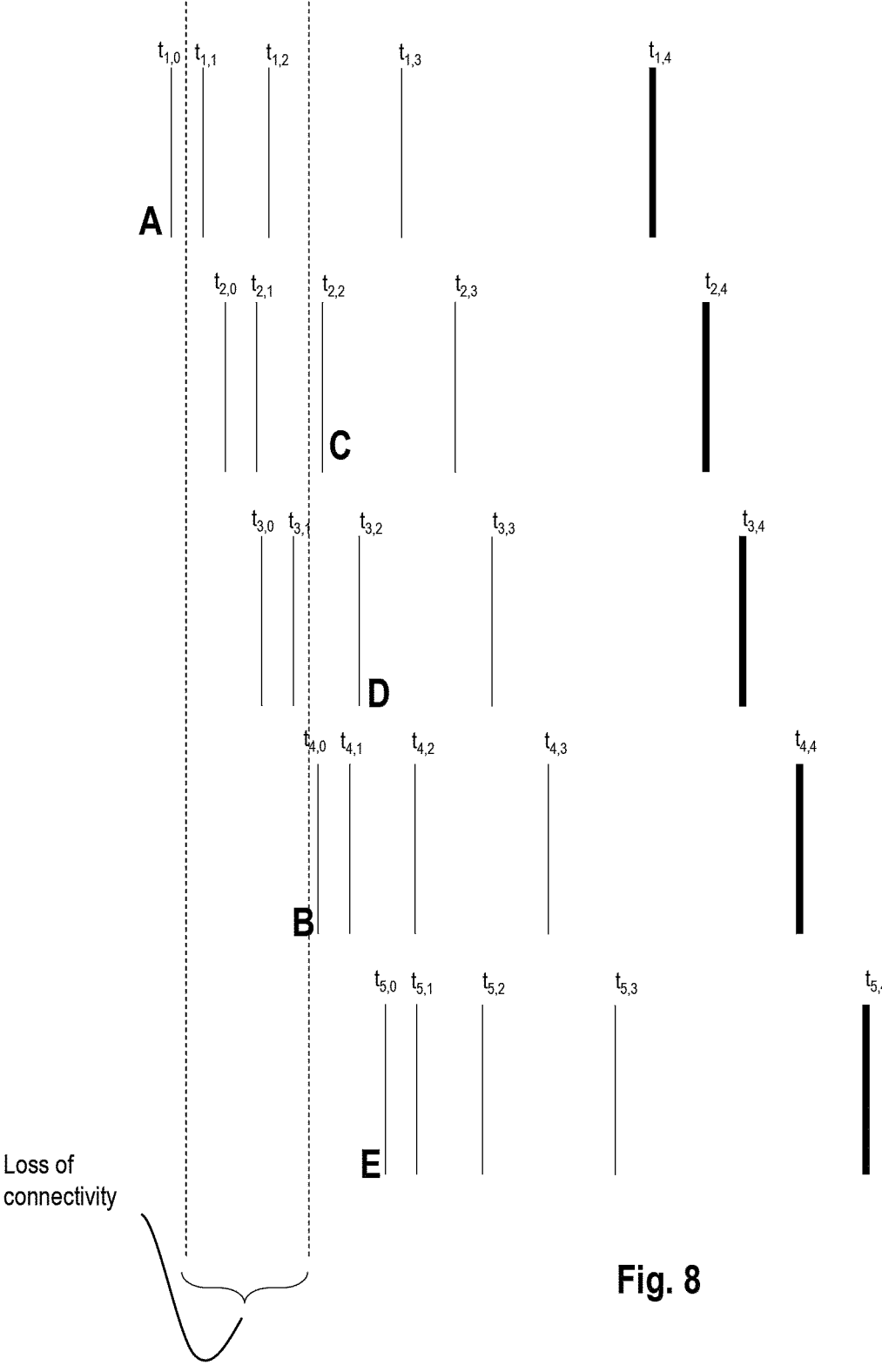
FIG. 8 is a timing diagram which is used to illustrate a process taking place after a loss of connectivity of a device.

An example of the process by which synchronization with the original history $H_0$ is resumed is illustrated with reference to FIG. 8. To recall, at a time $t_{i,j}$, the first subscript represents the number of the signal, and the second subscript represents the number of the history.

In a first step, a signal A containing information about the first state of the blockchain is received at time $t_{1,0}$ from the original, main history, $H_0$.

Then, as illustrated by the pair of dashed lines, there is a loss of connectivity. It is not possible to receive any signals during the loss of connectivity.

The reader will recall that once connectivity is resumed, the client device 102 receives not only the signals on the history onto which it has "hopped", but also the signals from the original history $H_0$ (or any earlier history). With this in mind, immediately after connectivity resumes signal B is received at $t_{4,0}$. This is in fact the signal containing information about the fourth state of the blockchain, but it is stored in the buffer of the client device 102. At this point a determination takes place as to whether information pertaining to every state of the blockchain up to the most recent (i.e. the fourth state) has been received. In this case, it has not, since no information has been received about the second and third states of the blockchain.

Recalling that it is necessary to receive information about every state of the blockchain up to the most recent in order to maintain synchronization with the blockchain, it is therefore necessary to receive information regarding the second and third states of the blockchain as well. So, in a next step, a signal C containing information about the second state of the blockchain is received at time $t_{2,2}$ on the history $H_2$. At this point, another determination takes place as to whether information regarding every state of the blockchain up to the most recent (i.e. still the fourth) has been received. As above, this is still not the case, since no information regarding the third state of the blockchain has yet been received.

In a next step, a signal D is received at time $t_{3,2}$, again from the history $H_2$, which contains information about the third state of the blockchain. A further determination takes place, and at this point, it is determined that information about all states of the blockchain up to the fourth and most recent has now been received. Accordingly, the client device 102 hops back to receiving signals from the original history $H_0$, the next being signal E containing information about the fifth state of the blockchain, at time $t_{5,0}$.

FIG. 9 is a flowchart demonstrating a general decision-making process which is employed by the client device 102 to re-synchronize with the main history $H_0$ after a loss of connectivity. It will be noted, however, that it is equally feasible that the client device 102 could synchronize with an earlier (but not main) history.

In a first step S100, the client device 102 receives a signal from the main history $H_0$ at a time $t_{x,0}$. Then, in step S102, there is a loss of connectivity, which lasts until step S104, when connectivity is resumed. In a next step S106, the client device receives the next signal arriving at either time $t_{y,0}$ (i.e. the next signal on the original history $H_0$ which arrives, pertaining to any $y^{th}$ state of the blockchain), or $t_{x+1,z}$ (i.e. the earliest signal arriving which contains information about the $(x+1)^{th}$ state of the blockchain on any history $H_z$). In response to receiving the additional signals, the client device 102 is then configured to store the information in its memory 1021, preferably the buffer 1032 thereof. This step S106 is repeated until the next signal from the original history $H_0$ (representing some $y^{th}$ state of the blockchain is received) at a time $t_{y,0}$. In other words, at step S108, it is determined whether the most recent signal received is from the history $H_0$, at a time $t_{y,0}$. The reason for this repetition is that, if a signal from the history $H_0$ is not received, then the client device 102 may not "know" what the most recent state of the blockchain is. If the result of the determination of step S108 is "no", the process returns to step S106. If so, determination step S110 takes place, in which it is determined whether information regarding all states of the blockchain up to the most recent state (in this case $y^{th}$) has been received, in other words, all states from (x+1) to y. If not, the process proceeds to step S112, in which either the next signal is received from $H_0$, or a signal representing the next unaccounted-for state of the blockchain is received. After this step 112, the process returns to step S110. If the outcome of step S110 is positive (i.e. information regarding all states of the blockchain up to the most recent state has been received), then the client device 102 resynchronizes with the original history $H_0$ in step S114, and receives all signals from the original history in future.

To describe the method of FIG. 9 in alternative language. After the device has regained connectivity, or equivalent, the method may further comprise the steps of:

(a) receiving the signal which arrives earlier of: a next signal from the original history $H_0$, or a next signal containing information about the next unaccounted-for state of the blockchain, and storing that information to the memory 1021 (preferably the buffer 1032 thereof), and repeating this step until a next signal from the original history $H_0$ has been received;

(b) determining whether information about all of the states of the blockchain up to the most recent state from the original history $H_0$ has been stored on the memory of the client device 102;

(c) if so, re-synchronizing with the original history $H_0$ such that subsequent signals, preferably all subsequent signals, are received from the original history $H_0$; and (d) if not, receiving the signal which arrives earlier of: a next signal from the original history $H_0$, or a next signal containing information about the next unaccounted-for state of the blockchain, and storing that information to the memory 1021 (preferably the buffer 1032 thereof), and repeating step (b) until a positive determination is returned. In this context, "unaccounted-for" refers to a past state of the blockchain for which there is currently no information stored in the memory 1021 of the client device 102. Such information is necessary in order for the client device 102 to be properly synchronized with the blockchain.

In the cases outlined above, the client device tunes into the main history $H_0$ and the history which first delivers the next missing state of the blockchain, and continues listening to that history until all of the gaps are filled. However, in some cases, the client device may be configured to receive updates from additional histories. In this way, it may be possible to resynchronize with the main history more quickly.

Figure 10:
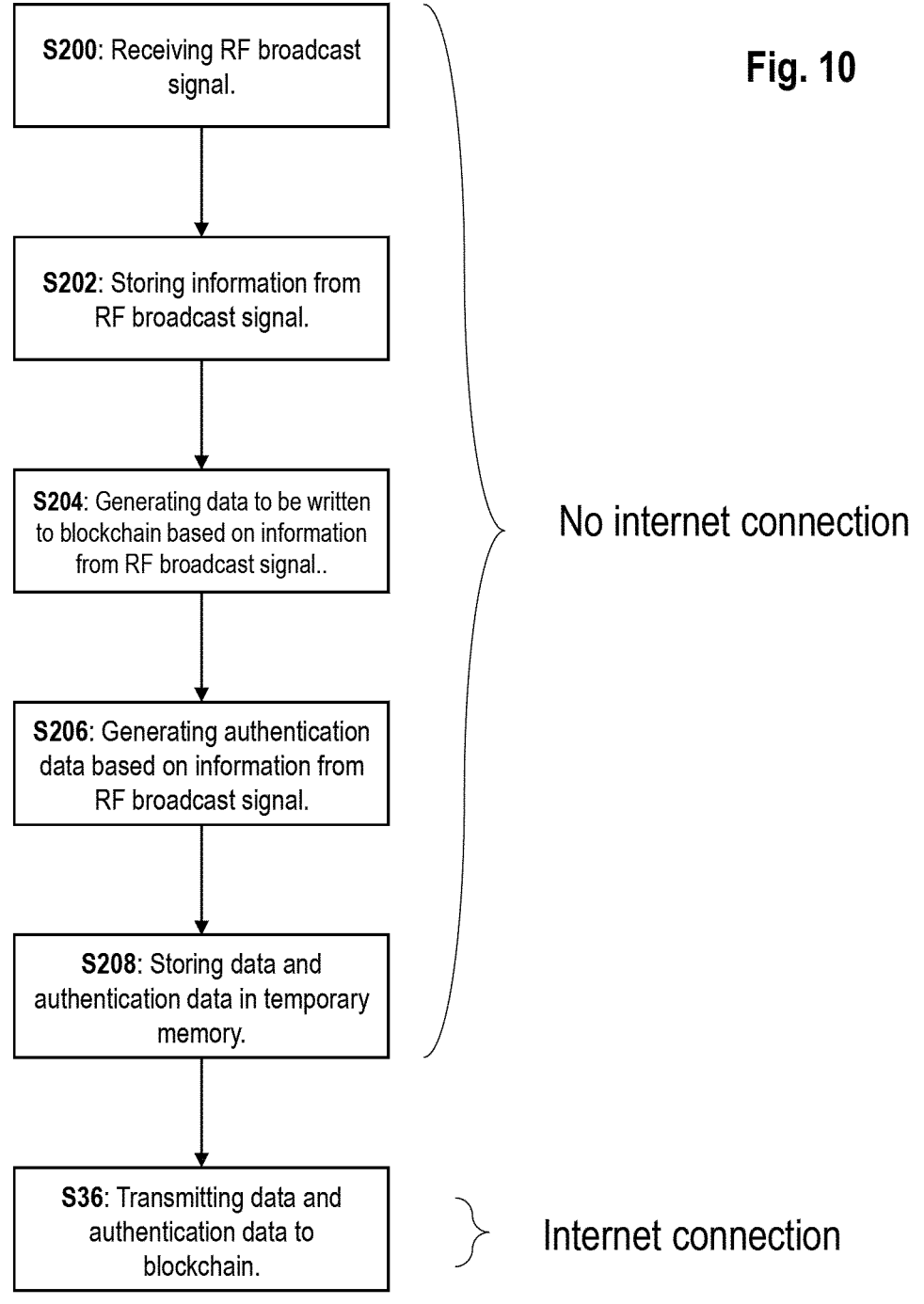
FIG. 10 is a flowchart illustrating a process by which the device may write data to the blockchain.

As well as maintaining synchronization with the block-chain 106, it may be desirable for the client device 102 to be able to write information to the blockchain as well. By the very nature of a blockchain, the device must be synchro-nized with the blockchain in order to write any new data to it, for security reasons, i.e. to ensure that users cannot tamper with earlier blocks. This represents the so-called "immuta-bility" of a blockchain. In order to write data to the block-chain 106, it is necessary for the client device 102 to have some kind of internet connectivity. However, as we have discussed throughout this application, the client device 102 may be low-powered, and may only have very intermittent and/or infrequent internet connectivity. Simply put, this may be achieved by the client device 102 recording events in its memory 1021, and authenticating those events using the information about the current state of the blockchain 106, and then when the client device 102 has some kind of bidirectional connection, or internet connectivity, uploading the stored events to the blockchain 106 (timestamped with the time at which the event was recorded). The events will be recorded on the blockchain 106 at the time when the device 102 resumes access to a bidirectional connection, or internet connection, but will retain a timestamp of the original recording time that is validated by the state of the blockchain 106 with which it always remained synchronized by virtue of the method of the present invention. As dis-cussed, the invention may provide a method of uploading data to a blockchain by a device having intermittent internet connectivity, the method including the following steps, which are illustrated in the flowchart of FIG. 10: receiving, in step S200, a first RF broadcast signal encoding informa-tion about a first state of a blockchain; storing, in step S202, the information about the first state of the blockchain in a memory; when there is no internet connectivity: generating data in step S204, to be written to the blockchain, the data including a timestamp indicating the time at which the data was generated; generating in step S206 authentication data based on the information about the first state of the block-chain; and storing the data and the authentication data in a temporary memory of the device in step S208; and when there is internet connectivity: transmitting the data and the authentication data to the blockchain via the internet in step S210. In some cases, generating the authentication data may comprise generating a signature using a secret (or private) key of the device. In such cases, the signature may be generated by applying the secret key to data representing the information about the first state of the blockchain, or to data derived from the information about the first state of the blockchain, preferably a hash of the information about the first state of the blockchain. In this manner, during some kind of audit step performed by a third party, the signature may be authenticated using a public key which is comple-mentary to the secret key in order to determine whether the information is genuine and has not been tampered with.

It will be appreciated that the device 102 may lose connectivity for a long period of time. Accordingly, at a later time the method may further include a step of receiving a second RF broadcast signal encoding information about a second state of a blockchain; storing the information about the second state of the blockchain in a memory; when there is no internet connectivity: generating data to be written to the blockchain, the data including a timestamp indicating the time at which the data was generated; generating authenti-cation data based on the information about the second state of the blockchain; and storing the data and the authentication data in a temporary memory of the device; and when there is internet connectivity: transmitting the data and the authen-tication data to the blockchain via the internet. It will be appreciated that this method may be generalized to an $i^{th}$ RF broadcast signal encoding information about an $i^{th}$ state of the blockchain.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accord-ingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method performed by an RF broadcast station for allowing a device to maintain synchronization with a blockchain for security purposes, the blockchain being in a series of states $S_i$, the method comprising:

receiving information about a first state $S_1$ of a blockchain;

encrypting the information about the first state $S_1$ of the blockchain with a session key;

generating a first RF broadcast signal encoding the encrypted information about the first state $S_1$ of the blockchain;

transmitting the first RF broadcast signal to the device at a first time $t_{1,0}$;

receiving information about a second state $S_2$ of the blockchain;

encrypting the information about the second state $S_2$ of the blockchain with the session key:

generating a second RF broadcast signal encoding the encrypted information about the second state $S_2$ of the blockchain;

transmitting the second RF broadcast signal to the device at a second time $t_{2,0}$, the second time $t_{2,0}$ and the first time $t_{1,0}$ being separated by a first interval;

re-transmitting the first RF broadcast signal at a third time $t_{1,1}$, the third time $t_{1,1}$ and the first time $t_{1,0}$ being separated by a second interval;

re-transmitting the second RF broadcast signal at a fourth time $t_{2,1}$, the fourth time $t_{2,1}$ and the second time $t_{2,0}$ being separated by the second interval;

re-transmitting the first RF broadcast signal at a fifth time $t_{1,2}$, the fifth time $t_{1,2}$ and the third time $t_{1,1}$ being separated by a third interval, the third interval being longer than the second interval; and re-transmitting the second RF broadcast signal at a sixth time $t_{2,2}$, the sixth time $t_{2,2}$ and the fourth time $t_{2,1}$ being separated by the third interval, wherein:

a zeroth history $H_0$ comprises a plurality of transmissions at times $t_{i,0}$, which are first transmissions of respective RF broadcast signals representing $i^{th}$ states $S_i$ of the blockchain;

a $j^{th}$ history $H_j$ comprises a plurality of transmissions at times $t_{i,j}$, which are $j^{th}$ retransmissions of respective RF broadcast signals representing $i^{th}$ states $S_i$ of the blockchain, and there are N histories in total; and for all i:

distributions of time intervals $\Delta t_{i,j} = t_{i,j} - t_{i,j(-1)}$ between transmissions of signals encoding information about the $i^{th}$ states $S_i$ is such that the device is able eventually to resynchronize with the zeroth history $H_0$ after a period of loss of connectivity; and a maximum time interval between an initial transmission of a signal encoding an $i^{th}$ state $S_i$ of the blockchain and a final retransmission of the signal encoding an $i^{th}$ state of the blockchain is equal to a maximum tolerable duration of a period of loss of connectivity of the device.

2. The method of claim 1, further comprising:

receiving a public encryption key from the device;

generating a broadcast encryption key based on at least the public encryption key of the device;

encrypting the session key with the broadcast encryption key; and transmitting the encrypted session key to the device, the encrypted session key being decryptable using a private decryption key on the device, the private decryption key being complementary to the public encryption key.

3. The method of claim 2, further comprising:

receiving a plurality of registration requests from a respective plurality of devices, each registration request comprising a public encryption key associated with that device; and determining whether each registration is a valid registration request;

wherein the broadcast encryption key is generated based only on the public encryption keys of those devices whose registration requests were determined to be valid registration requests.

4. The method of claim 2, wherein the session key is a rotating session key; and further comprising:

generating a new session key;

encrypting the new session key with the broadcast encryption key; and transmitting the encrypted session key.

5. A method performed by a device for maintaining synchronization between the device and a blockchain based on a plurality of RF broadcast signals, the method comprising:

receiving a first RF broadcast signal, the first RF broadcast signal encoding encrypted information about a first state $S_1$ of the blockchain;

decrypting the information about a first state $S_1$ of the blockchain using a session key:

storing the information about the first state $S_1$ of the blockchain in a memory of the device;

wherein after the device misses at least one transmission of an $i^{th}$ RF broadcast signal in a history $H_j$ at at least one time $t_{i,j}$, the method further comprises:

receiving a retransmitted version of the $i^{th}$ RF broadcast signal from a subsequent history $H_k$ at a time $t_{i,k}$ where k>j, the retransmitted version of the $i^{th}$ RF broadcast signal encoding encrypted information about an $i^{th}$ state $S_i$ of the blockchain;

decrypting the information about the $i^{th}$ state $S_i$ of the blockchain using the session key; and storing the information about the $i^{th}$ state $S_i$ of the blockchain in the memory of the device; and wherein after the device has stored information about an $i^{th}$ state $S_i$ of the blockchain based on an RF broadcast signal from a subsequent history $H_k$ at a time $t_{i,k}$, the method further comprises both:

at times $t_{i,m}$ receiving information about later states of the blockchain from an earlier history $H_m$ where m<k and storing the information to a buffer of the memory; and receiving information about at least an $(i+1)^{th}$ state $S_{i+1}$ of the blockchain from the subsequent history $H_k$ at times $t_{n,k}$ where n={i+1, i+2 . . . } and storing the information to the buffer of the memory; and when all of the information resulting from missed transmissions has been obtained from history $H_k$, combining the information received from the histories $H_k$ and $H_m$, thereby restoring synchronization, and continuing to obtain information from RF broadcast signals in history $H_m$.

6. The method of claim 5 wherein the earlier history $H_m$ is an original history $H_0$.

7. The method of claim 5, further comprising, after the device has regained connectivity:

(a) receiving a signal which arrives earlier of: a next signal from an original history $H_0$, or a next signal containing information about a next unaccounted-for state of the blockchain, and storing that information to the memory, and repeating this step until a next signal from the original history $H_0$ has been received;

(b) determining whether information about states of the blockchain up to a most-recent state from the original history $H_0$ has been stored in the memory of the device;

(c) if so, re-synchronizing with the original history $H_0$ such that subsequent signals, preferably all subsequent signals, are received from the original history $H_0$; and (d) if not, receiving the signal which arrives earlier of: a next signal from the original history $H_0$, or a next signal containing information about the next unaccounted-for state of the blockchain, and storing that information to the memory, and repeating step (b) until a positive determination is returned.

8. The method of claim 5, further comprising:

when there is no internet connectivity:

generating data to be written to the blockchain, the data including a timestamp indicating the time at which the data was generated;

generating authentication data based on the information about the first state $S_1$ of the blockchain; and storing the data and the authentication data in a temporary memory of the device; and when there is internet connectivity:

transmitting the data and the authentication data to the blockchain via the internet.

9. An apparatus for allowing a device to maintain synchronization with a blockchain for security purposes, the blockchain being in a series of states $S_i$, the apparatus comprising:

at least one memory; and at least one processor coupled to the at least one memory and configured to:

receive information about a first state $S_1$ of a blockchain;

encrypt the information about the first state $S_1$ of the blockchain with a session key;

generate a first RF broadcast signal encoding the encrypted information about the first state $S_1$ of the blockchain;

cause at least one transmitter to transmit the first RF broadcast signal to the device at a first time $t_{1,0}$;

receive information about a second state $S_2$ of the blockchain;

encrypt the information about the second state $S_2$ of the blockchain with the session key;

generate a second RF broadcast signal encoding the encrypted information about the second state $S_2$ of the blockchain;

cause the at least one transmitter to transmit the second RF broadcast signal to the device at a second time $t_{2,0}$, the second time $t_{2,0}$ and the first time $t_{1,0}$ being separated by a first interval;

cause the at least one transmitter to re-transmit the first RF broadcast signal at a third time $t_{1,1}$, the third time $t_{1,1}$ and the first time $t_{1,0}$ being separated by a second interval;

cause the at least one transmitter to re-transmit the second RF broadcast signal at a fourth time $t_{2,1}$, the fourth time $t_{2,1}$ and the second time $t_{2,0}$ being separated by the second interval;

cause the at least one transmitter to re-transmit the first RF broadcast signal at a fifth time $t_{1,2}$, the fifth time $t_{1,2}$ and the third time $t_{1,1}$ being separated by a third interval, the third interval being longer than the second interval; and cause the at least one transmitter to re-transmit the second RF broadcast signal at a sixth time $t_{2,2}$, the sixth time $t_{2,2}$ and the fourth time $t_{2,1}$ being separated by the third interval, wherein:

a zeroth history $H_0$ comprises a plurality of transmissions at times $t_{i,0}$, which are first transmissions of respective RF broadcast signals representing $i^{th}$ states $S_i$ of the blockchain;

a $j^{th}$ history $H_j$ comprises a plurality of transmissions at times $t_{i,j}$, which are $j^{th}$ retransmissions of respective RF broadcast signals representing $i^{th}$ states $S_i$ of the blockchain, and there are N histories in total; and for all i:

distributions of time intervals $\Delta t_{i,j} = t_{i,j} - t_{i,(j-1)}$ between transmissions of signals encoding information about the $i^{th}$ states $S_i$ is such that the device is able eventually to resynchronize with the zeroth history $H_0$ after a period of loss of connectivity; and a maximum time interval between an initial transmission of a signal encoding an $i^{th}$ state $S_i$ of the blockchain and a final retransmission of the signal encoding an $i^{th}$ state of the blockchain is equal to a maximum tolerable duration of a period of loss of connectivity of the device.

10. The apparatus of claim 9, wherein the at least one processor is configured to:

receive a public encryption key from the device;

generate a broadcast encryption key based on at least the public encryption key of the device;

encrypt the session key with the broadcast encryption key; and cause the at least one transmitter to transmit the encrypted session key to the device, the encrypted session key being decryptable using a private decryption key on the device, the private decryption key being complementary to the public encryption key.

11. The apparatus of claim 10, wherein the at least one processor is configured to:

receive a plurality of registration requests from a respective plurality of devices, each registration request comprising a public encryption key associated with that device; and determine whether each registration is a valid registration request;

wherein the broadcast encryption key is generated based only on the public encryption keys of those devices whose registration requests were determined to be valid registration requests.

12. The apparatus of claim 10, wherein the session key is a rotating session key and wherein the at least one processor is configured to:

generate a new session key;

encrypt the new session key with the broadcast encryption key; and cause the at least one transmitter to transmit the encrypted session key.

13. The apparatus of claim 9, wherein the apparatus comprises an RF broadcast station.

14. The apparatus of claim 9, wherein the apparatus comprises the at least one transmitter.

* * * * *